C. M. MANLY.
SPEED CONTROLLER.
APPLICATION FILED OCT. 6, 1906.
1,164,109.
Patented Dec. 14, 1915.
2 SHEETS—SHEET 1.
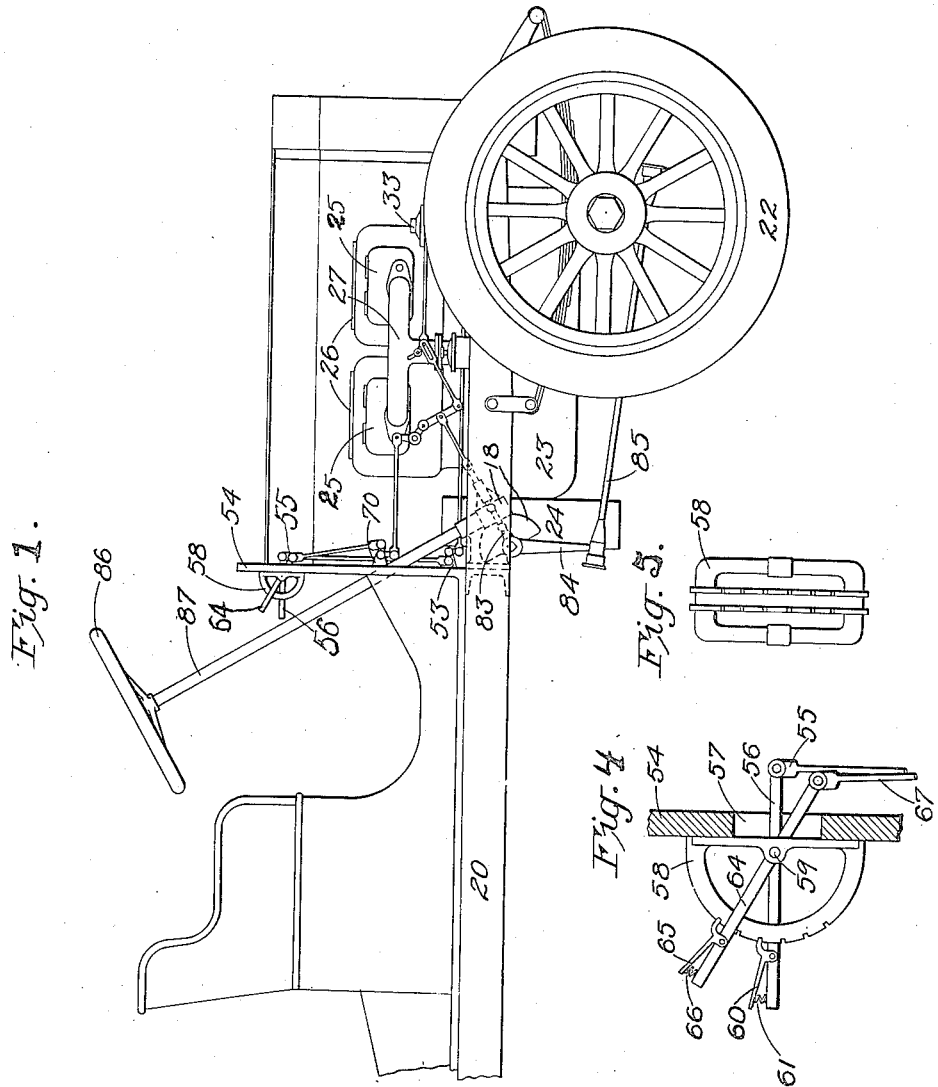
WITNESSES:
James C. Barnaby
Ida M. Hatch
INVENTOR
Chas. M. Manly
BY
Smith & Frazier
ATTORNEYS.

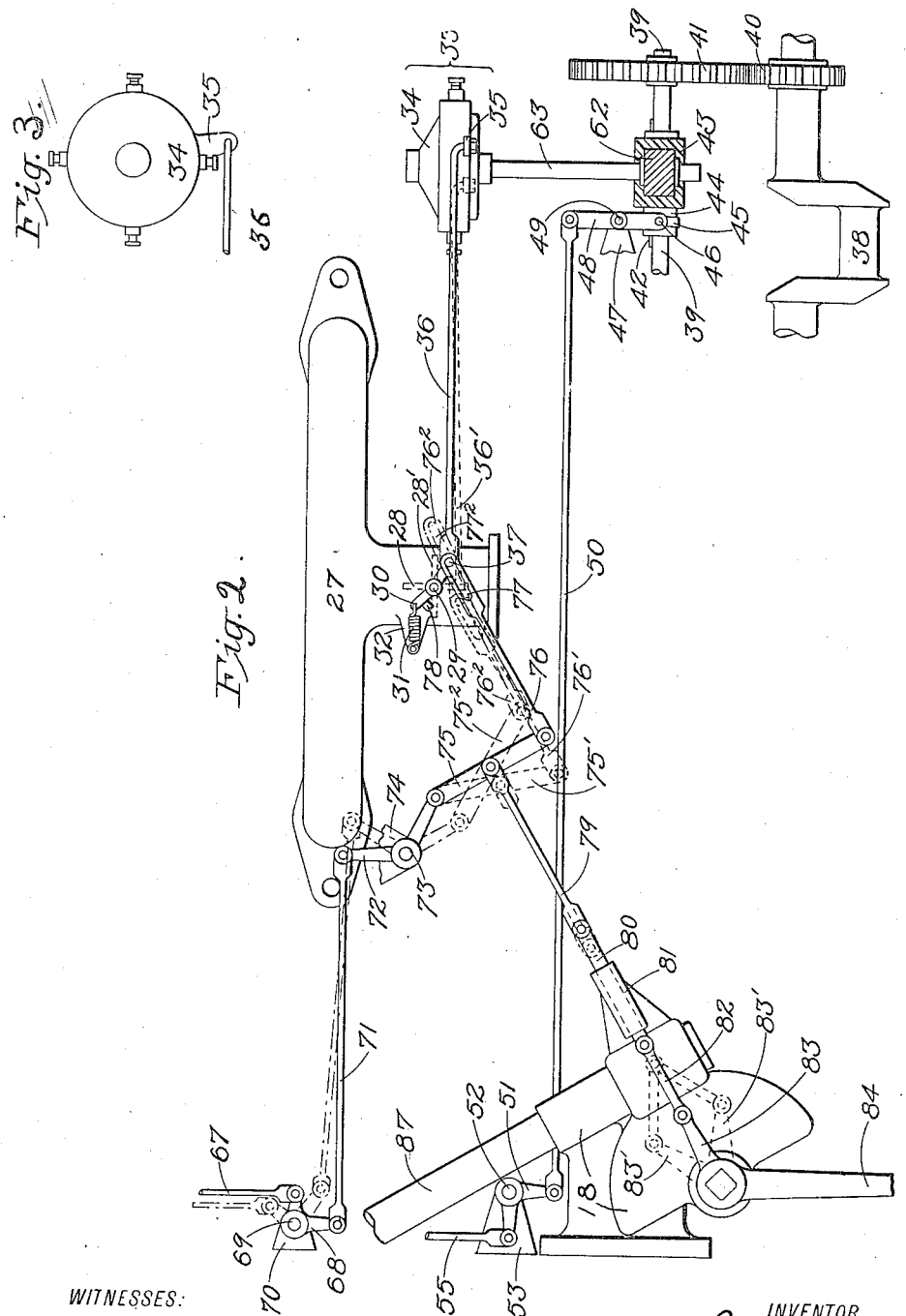

UNITED STATES PATENT OFFICE.

CHARLES M. MANLY, OF NEW YORK, N. Y.

SPEED-CONTROLLER.

1,164,109.

Specification of Letters Patent.

Patented Dec. 14, 1915.

Application filed October 6, 1906. Serial No. 337,714.

*To all whom it may concern:*

Be it known that I, CHARLES M. MANLY, a citizen of the United States, residing in New York city, county and State of New York, have invented certain Improvements in Speed-Controllers, of which the following is a specification.

My invention relates to a speed controller especially adapted for use on motor vehicles, and which is so connected with the steering mechanism of the motor vehicle that the turning of the vehicle will cause the speed controller to automatically reduce the speed of said vehicle to an extent proportional to the sharpness of the curve through which the vehicle is turning.

Another object is to provide such a mechanism that, while it operates automatically under ordinary conditions, the operator may at will cause the automatic operation to be subsidiary to manual control.

With these objects in view, my invention consists of the combination with a motor vehicle embodying means for driving it and means for steering it, of correlating means between the said driving means and the said steering means whereby motion of the steering means to either side of its neutral position, which would cause the vehicle to travel in a straight course, will, within certain limits, cause the speed of the vehicle to be reduced to an extent dependent on the extent of motion of the steering means; and, further, in combination therewith, manual control means through which the operator may at will change the said limits between which the control is automatic; and my invention further consists in the novel construction and details thereof, as hereinafter described with reference to the accompanying drawings, and more particularly pointed out in the claims.

My invention will be best understood by reference to the accompanying drawings which illustrate one form in which it may be carried out.

In the drawings: Figure 1 is a side elevation of the front end of a conventional form of motor vehicle showing the application thereto of one form of my speed controller; Fig. 2 is an enlarged detail view thereof; and Figs. 3, 4, and 5 are detail views hereinafter referred to.

Referring to the drawings, the numeral 20 indicates the vehicle frame, 22 the steering wheels, 23 the engine, and 24 the fly wheel; the engine being supposed to be connected through any form of transmission gear with the rear driving wheels, the transmission gear and rear wheels being omitted for the sake of clearness. The rear end of the vehicle and driving wheels and transmission mechanism may be of any suitable type, the latter mechanism, however, being preferably of the form of transmission mechanism disclosed in my Letters Patent, numbered 801,097, dated October 5, 1905. This form of my speed controller acts through the ignition apparatus and the explosive mixture mechanism to change the speed of the engine and thereby the speed of the vehicle, and I have therefore shown more in detail the engine and certain of its auxiliary parts. Connected to the combustion chamber 25 of the engine cylinders 26, is the inlet pipe 27, in the vertical branch of which is mounted a throttle valve 28 shown dotted as in a vertical position when the co-acting parts are in the positions represented by the solid lines in Fig. 2. The stem 29 of the throttle 28 extends through the side of the pipe 27 and on it is mounted the double end lever 30, one end of which is connected to a tension spring 31 which is fastened to the bracket 32 formed on the side of the pipe 27, the said spring 31 tending to hold the throttle valve 28 in its vertical position, with the lever 30 against the stop 78 formed on the inlet pipe 27. Mounted on the side of the engine, and suitably geared thereto, is the ignition control device 33, here supposed to be of the usual form consisting of a relatively fixed part co-acting with a rotating part, and in which the relatively fixed part may be at will adjusted to either retard or advance the ignition of the engine.

In Fig. 3 (which is a detached plan view of the ignition apparatus), we will assume that clock-wise adjustment of the relatively fixed part 34 acts to retard the ignition, while counter-clockwise adjustment acts to advance the ignition. Formed on the side of the cap 34 is an arm 35 to which is connected the rod 36, the other end of which is connected by a pin 37 to the right hand end of the lever 30 of the throttle valve 28, see Fig. 2. In the lower right hand corner of Fig. 2 I have shown a conventional representation of the engine crank shaft 38 which drives the shaft 39 through the gears 110

40 and 41. Slidably mounted on the shaft 39 by means of the key 42 is a spiral gear 43, the left hand end of the spiral gear being prolonged into a neck 44 in which is formed a groove in which is rotatably mounted a collar 45 which carries a pin 46. Connected to the frame 20 of the vehicle is a bracket 47 (shown broken in Fig. 2) to which is connected a lever 48, at a point intermediate of its ends, by the pin 49, and the lower end of the lever 48 is connected to the pin 46 on the collar 45, while its upper end is connected to a rod 50, the other end of which is connected to the vertical arm of the bell crank 51 mounted on the pin 52 carried by the bracket 53, which, in Fig. 1, is shown mounted on the dashboard 54 of the vehicle. Connected to the horizontal arm of the bell crank 51 is a rod 55, the upper end of which is connected to one end of a lever 56 which passes through the hole 57 in the dashboard 54, the said lever 56 being mounted on the notched sector 58 and secured thereto by the pin 59, as shown more clearly in Fig. 4. Near the other end of the lever 56 is hinged a pawl 60 which engages with the notches of the sector 58 and is normally held in contact therewith by the spring 61. It is evident that when the lever 56 is locked by the pawl 60 on the sector 58, the spiral gear 43 will be locked against sliding on the shaft 39. Coacting with the horizontal spiral gear 43 is a vertical spiral gear 62 secured on the shaft 63 which enters the casing 34 of the ignition apparatus and is supposed to drive the rotating part of the same. It is now evident that by moving the lever 56 on the sector 58, the spiral gear 43 may be moved either to the right or to the left, and that motions in one direction will move the spiral gear 62 ahead of where it would be through its motion derived from the crank shaft 38 through the spur gears 40 and 41, and therefore advance the ignition without moving the relatively fixed casing 34, while motions of the spiral gear 43 in the opposite direction will retard the ignition correspondingly.

It will be clearly seen from Fig. 5 that the sector 58 is double, thereby providing means for mounting on it another lever 64 having a pawl 65 and spring 66, and that each part of said sector is provided with notches with which the respective pawls of each lever may engage. Connected to the other end of the lever 64, is a rod 67, the lower end of which is connected to one arm of the bell crank 68, carried by a pin 69 on the bracket 70 suitably secured to the dashboard 54. To the other arm of the bell crank 68 is connected a link 71, the other end of which link is connected to one arm of the bell crank 72 mounted on the pin 73 of the bracket 74, which is suitably mounted on the side of the engine. To the other arm of the bell crank 72 is connected a link 75 and to the other end of the link 75 is connected a link 76. In the other end of the link 76 is formed an oblong slot 77 through which it is connected by the pin 37 with the lever 30 of the throttle valve 28. Connected to the link 75, at a point intermediate of its ends, is a link 79, and connected to the other end of the link 79 is a rod 80 slidably mounted in a bracket 81 formed on the casing of the steering mechanism. Connected to the other end of the rod 80 is a link 82, the other end of the link 82 being connected to the short lever 83 formed on the side of the steering lever 84, which latter connects with the drag link 85 of the steering mechanism 18 as shown in Fig. 1.

Assuming the parts to be in the positions shown by the solid lines in Figs. 1 and 2 and that the vehicle is moving forward in a straight course, let us suppose that the hand wheel 86 on the steering shaft 87 is turned in either direction and thereby through the steering lever 84 and the drag link 85 causing the steering wheels 22 to be so adjusted as to cause the vehicle to turn; the short lever 83 on the steering lever 84 will be adjusted to one side or the other of its normal position, and we will suppose that it is moved until it occupies either one of the two positions shown by the dotted lines designated by the numeral 83', thereby through the link 82, rod 80, and link 79, causing the link 75 to be moved to the position indicated by the dotted lines and designated by the numeral 75', it being understood that the manual control levers 56 and 64 have not been moved from their positions shown by the solid lines. The link 75 being moved to the position 75' will act through the link 76 to adjust the throttle valve 28 from its vertical position to some such position as that shown by the horizontal dotted lines designated by the numeral 28', thereby throttling the explosive mixture to such an extent that only the small amount of mixture necessary to keep the engine running at a low speed can pass between the periphery of the throttle valve and the interior of the vertical branch of the inlet pipe 27. This position of the throttle valve is supposed to be reached when the steering mechanism has been adjusted to its extreme limit on either side of its normal straight ahead position. At the same time that the link 75 has moved the throttle valve to its extreme position, it has also caused the relatively fixed part 34 of the ignition apparatus 33, which is connected through the rod 36 and pin 37 to the throttle valve 28, to be adjusted until the rod 36 occupies some such position as that indicated by the dotted lines designated by the numeral 36', which adjustment, as previously explained, is supposed to retard the ignition of the motor. It is to be understood that the apparatus is intended to be so arranged that the ignition is retarded to its extreme limit at about the same time that the throttle valve is moved to its extreme limit.

With the parts in the positions shown by the dotted lines above described, should the operator find that the throttle valve has been closed too much, it may be opened to any desired extent, without changing the steering apparatus, by releasing the pawl 65 on the lever 64 and moving the lever 64 downward on the sector 58, thereby through the rod 67, bell crank 68, rod 71 and bell crank 72, moving the upper end of the link 75 (in Fig. 2) toward the left, thereby causing the rod 76 to be moved toward the right, which permits the spring 31 acting through the lever 30 to adjust the throttle valve 28 in a counter-clockwise direction, thereby opening the said throttle valve 28 to an extent depending on the extent of movement of the lever 64. At the same time that the throttle valve 28 is moved in a counter-clockwise direction, the rod 36, connected to the throttle valve lever 30 through the pin 37, will move toward the right, thereby adjusting the relatively fixed part 34 of the ignition apparatus in a counter-clockwise direction, which, as explained above, is supposed to advance the ignition. Should it be desired to advance or retard the ignition without affecting the adjustment of the throttle valve 28 it may be done by means of the manual control lever 56, it being here supposed that the movement of the said lever 56 in a downward direction on the sector 58 (as viewed in Fig. 4) will act through the rod 55, bell crank 51, rod 50 and lever 48 to move the spiral gear 43 toward the right in Fig. 2, which, acting on the spiral gear 62, will cause the shaft 63 to be adjusted in a clockwise direction as viewed from above, and, since the shaft 63 is supposed to drive the rotating part of the ignition apparatus, such adjustment of the shaft 63 in a clockwise direction will advance the point of ignition. Similarly, movement of the manual control lever 56 in an upward direction as viewed in Fig. 4, acting through the various rods, bell cranks, levers and the spiral gears, will cause the point of ignition to be retarded. It will furthermore be seen that when the steering gear is adjusted for straight ahead motion, and all the connected parts are in the positions shown by the solid lines in Fig. 2, if the manual control lever 64 is moved downward on the sector 58 (as shown in Fig. 4) it will act through the rod 67, bell crank 68, rod 71 and bell crank 72 to move the upper end of the link 75 toward the left in Fig. 2, and assuming that the link 75 is moved to the position indicated by the dotted lines designated by the numeral $75^2$, the link 76 will be moved toward the right to the position indicated by the dotted lines $76^2$, thereby moving the right hand end of the slot 77 away from the pin 37. If, now, the steering gear is so moved as to cause the vehicle to turn, the said movement of the steering gear will not act to move the throttle valve or the ignition apparatus, until such motion of the steering apparatus through its connections therewith, as above described, shall have moved the slot 77 from the dotted line position $77^2$, to the left in Fig. 2, until the right hand end of the said slot 77 has been brought in contact with the pin 37. Similarly if the lever 64 had been moved only a small amount, it would have moved the slot 77 only a small amount, and the movement of the steering gear would then begin to move the throttle valve and ignition apparatus as soon as it is moved to a sufficient extent to cause the right hand end of the slot 77 to come in contact with the pin 37. Since such adjustments of the rod 76 and its slot 77 through the manual control lever 64 prevent the speed controller from acting until the steering apparatus has been moved to an extent sufficient to cause the right hand end of the slot 77 to be brought in contact with the pin 37, the operator may by this means at will determine the point at which the movement of the steering gear will begin to automatically control the speed of the vehicle.

From the above description of the manual control levers 56 and 64, it will readily be seen that movements of them from their normal position act to change the limits between which the movement of the steering gear automatically controls the throttle valve and the ignition apparatus. It is also evident that when the steering mechanism is in the position for straight ahead movement of the vehicle, the manual control levers 56 and 64 also provide means for maintaining such control of the ignition and explosive mixture apparatus as is at present provided on motor vehicles, so that the addition of my improved speed controller, whereby the turning of the vehicle automatically acts to reduce its speed, in no way interferes with the usual engine control mechanism with which motor vehicles are at present equipped.

It will of course be understood that, where it is desired that the operator shall not be able to appreciably change the limits between which the steering gear automatically controls the speed of the vehicle, it may be done by restricting the extent of the possible adjustment of the manual control levers 56 and 64, or, if it is desired, the manual control levers may be dispensed with altogether. It will also be readily seen, in Figs. 1 and 2, that, with the arrangement of parts there shown, small adjustments of the steering mechanism for straight away motion of the vehicle cause comparatively less motion of the link 76, and, therefore, less motion of the throttle valve and ignition device, than large adjustments thereof, since the link 76 is moved very little by small angular adjustments of the lever 83, in comparison to the extent of its motion due to larger angular adjustments of said lever 83, which cause the vehicle to travel in correspondingly sharper paths of curvature.

Referring to the drawings, it will readily be seen that in Fig. 1 the lever 83, through which movements of the steering gear cause corresponding movements of the speed controller mechanism, may be connected to the steering wheels 22 instead of to the steering lever 84, so that the movements of the speed controller mechanism may be derived directly from the movements of adjustment of the said steering wheels 22, and that so deriving the movement of the speed controller mechanism directly from the steering wheels would insure the action of the speed controller to reduce the speed of the vehicle, should the parts which connect the steering wheels with the steering mechanism break down, and thereby leave the wheels free to divert the vehicle from a straight ahead course. It will also be readily understood that, in motor vehicles adapted to travel on rails, and in which type of vehicle no steering gear is used, the wheels of the vehicle being free to adjust themselves with reference to the body of the vehicle to whatever extent they are caused to do so by the curvature of the rails, my speed controller would in such a case be so connected with the vehicle wheels as to cause the speed controller mechanism to derive its motion from the angular movement of the vehicle wheels with respect to the body of the vehicle.

The invention, in respect to the more general features specified in the claims, is not limited to the particular devices herein described, for it is obvious that, without departure from the principle of construction and operation, the same results may be secured by many arrangements, the well recognized equivalents, mechanically, of those herein described.

I claim as my invention:

1. In a motor vehicle, the combination of means for driving the vehicle, means for steering the vehicle, means for controlling the speed of the vehicle, and means operated by steering movement of said steering means for actuating said speed controlling means.

2. In a motor vehicle, the combination of means for driving the vehicle, means for steering the vehicle, means for controlling the speed of the vehicle, and means operated by steering movement of said steering means within certain limits for actuating said speed controlling means.

3. In a motor vehicle, the combination of means for driving the vehicle, means for steering the vehicle, means for controlling the speed of the vehicle, means operated by steering movement of said steering means within certain limits for actuating said speed controlling means and manually operatable means for changing the said limits.

4. In a motor vehicle, the combination of means for driving the vehicle, means for steering the vehicle, means for controlling the speed of the vehicle, and means operated by steering movement of said steering means for actuating said speed controlling means to reduce the speed of the vehicle.

5. In a motor vehicle, the combination of means for driving the vehicle, means for steering the vehicle, means for controlling the speed of the vehicle and means operated by steering movement of said steering means, for actuating said speed controlling means to reduce the speed of the vehicle to an extent proportional to the extent of said steering movement, 6. In a motor vehicle, the combination of means for driving the vehicle, means for steering the vehicle, means for controlling the speed of the vehicle, means operated by steering movement of said steering means within certain limits for actuating said speed controlling means to reduce the speed of the vehicle to an extent proportional to the extent of said steering movement, and manually operatable means for changing said limits.

7. In a motor vehicle comprising a vehicle frame, driving wheels, steering wheels, means for adjusting the steering wheels, an internal combustion engine, and means for transmitting the power from the engine to the driving wheels, the combination of means for controlling the fuel supply of the engine, and correlating mechanism between the said steering means and the said fuel supply controlling means whereby adjustment of the steering means to steer the vehicle will automatically control the fuel supply controlling means.

8. In a motor vehicle comprising a vehicle frame, driving wheels, steering wheels, means for moving the steering wheels, an internal combustion engine, and means for transmitting the power from the engine to the driving wheels, the combination of means for controlling the ignition apparatus of the engine, and correlating mechanism between the said steering means and the said ignition controlling apparatus whereby adjustments of the steering means to steer the vehicle will automatically control the ignition apparatus.

9. In a motor vehicle driven by an internal combustion engine comprising means for controlling its fuel supply and means for controlling its ignition apparatus, the combination of means for steering the vehicle, and correlating means between the steering means and the said means for controlling the fuel supply and the ignition control apparatus, whereby the operation of the vehicle steering means to steer the vehicle will automatically control the speed of the engine.

10. In a motor vehicle, the combination of driving mechanism embodying a prime motor, steering mechanism, means for controlling the speed of the prime motor, and means operated by steering movement of the steering mechanism for actuating said speed controlling means.

11. In a motor vehicle, the combination of a frame, supporting wheels therefor one of which is angularly movable relative thereto, means for driving the vehicle, means for controlling the speed of the vehicle and means operated in synchronism with the angular movement of said movable wheel for actuating said speed controlling means.

12. In a motor vehicle, the combination of a frame, supporting wheels therefor one of which is angularly movable relative thereto, means for driving the vehicle, means for controlling the speed of the vehicle and means operated in synchronism with the angular movement of said movable wheel for actuating said speed controlling means, to reduce the speed of the vehicle to an extent proportional to the extent of such angular movement.

13. In a motor vehicle comprising a frame, vehicle wheels, and means for permitting the plane of rotation of the wheels to be angularly moved with reference to the vehicle frame, the combination of means for driving the vehicle, means for controlling the speed of the vehicle, and mechanism operated by the said angular movement of said wheels for actuating said speed controlling means to cause progressive changes in the speed of the vehicle.

14. In a motor vehicle comprising a frame, vehicle wheels, and means for permitting the plane of rotation of the wheels to be angularly moved with reference to the vehicle frame, the combination of an internal combustion driving engine, means for controlling the speed of the engine, and mechanism operated by the said angular movement of said wheels for actuating said speed controlling means to cause constantly progressive changes in the speed of the vehicle.

In testimony whereof, I have signed my name to this specification, in the presence of two subscribing witnesses.

CHARLES M. MANLY.

Witnesses:
　ALBERT H. OVERMAN,
　IDA M. HATCH.